W. W. DUTCHER.
LOOM-TEMPLE.
No. 6,932. Reissued Feb. 15, 1876.
Fig. 1.
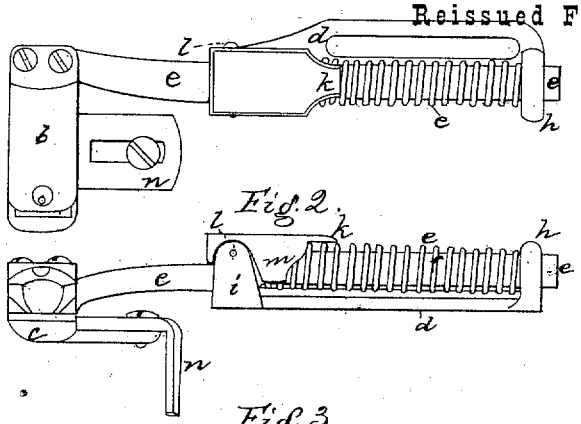
Fig. 2.
Fig. 3.
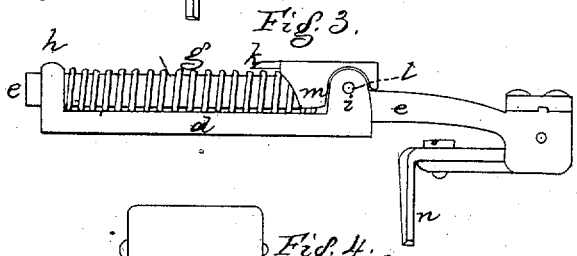
Fig. 4.
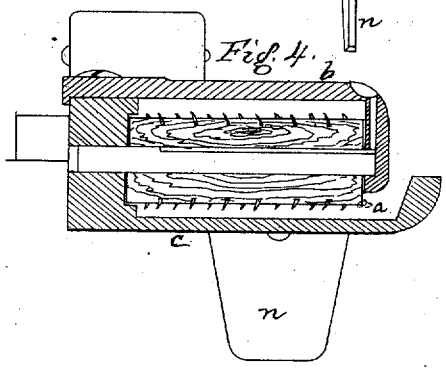
Fig. 5.
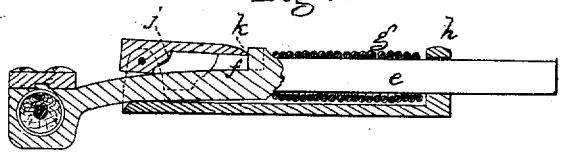
Witnesses.
L. H. Latimer.
W. J. Pratt.
Inventor:
George Draper,
President of the Dutcher Temple Co.
Assignee Warren W. Dutcher
per Lemby & Gregory Attys.
N. PETERS, PHOTO-LITHOGRAPHER, WASHINGTON, D. C.

UNITED STATES PATENT OFFICE.

WARREN WHITNEY DUTCHER, OF HOPEDALE, MASSACHUSETTS, ASSIGNOR TO THE DUTCHER TEMPLE COMPANY.

IMPROVEMENT IN LOOM-TEMPLES.

Specification forming part of Letters Patent No. 97,895, dated December 14, 1869; reissue No. 6,932, dated February 15, 1876; application filed February 7, 1876.

*To all whom it may concern:*

Be it known that I, WARREN WHITNEY DUTCHER, of Hopedale, Worcester county, and State of Massachusetts, have invented certain new and useful Improvements in Loom-Temples, of which the following is a description:

During the operation of weaving cloth on looms it is often desirable, and practically necessary, to hold the temples back for the purpose of removing from the warp any filling that may have been improperly introduced, and also for other purposes, and during this operation the weaver holds back the temple by hand, or wedges it back by some means not forming part of the temple.

The object of this invention is to hold the temple back automatically when it is desired to permit the removal of weft, or for other usual purposes; and this invention consists in a movable temple-stock adapted to be struck and moved by the lay, in combination with a stop adapted to engage and hold the temple-stock back.

In carrying out this invention a loom-temple has combined with it a mechanism to hold back its stock when retracted within its stand.

The stop, adapted to engage and hold the stock when pressed back, is shown as serving also the purposes of a guard or cover to prevent oil from being thrown from the front stop on the cloth.

Figure 1 represents this invention in top view, with stock forward; Fig. 2, a side view thereof; Fig. 3, a view of the opposite side of the temple from that shown in Fig. 2; Fig. 4, a longitudinal section through the roller, cap, and trough; and Fig. 5, a section through the stock, stand, and roller.

The temple-roller *a*, the cap and trough *b c*, and stand *d* are of usual construction, and the stock *e*, guided in the stand and provided with a notch, *f*, is surrounded by a spiral spring, *g*, placed between the ears *h i*, the spring keeping the temple pressed forward against the forward stop *j*, which, in this instance, is part of the stop *k*, adapted to hold the stock back, such stop *k* being attached to the stand at *l*, and so as to engage and hold back the stock, as in Fig. 5, and the lips *m* overlap the stock and prevent the discharge of oil on the cloth.

When the stock is retracted, as in Fig. 5, the stop *k* engages the stock and holds it back. By disengaging the stop from the temple-stock the stock will be pressed forward against the forward stop *j*.

The heel *n* is struck by the lay, as usual, and the temple moves with the cloth as beat up by the lay.

I claim—

1. In a roller-temple, a movable temple-stock, adapted to be struck and moved by the lay, in combination with a stop adapted to engage and hold the temple-stock back, for the purpose described.

2. The stop *k*, constructed as described, and adapted to serve as a front stop and as a holder for the stock, as described.

3. The combination, with the stock and stand, of the stop *k* and its lips *m*, to prevent the oil on the temple from being thrown on the cloth.

WARREN WHITNEY DUTCHER.

Witnesses:
EBEN D. BANCROFT,
FRANK. J. DUTCHER.